United States Patent [19]
Takahashi

[11] Patent Number: 5,708,452
[45] Date of Patent: Jan. 13, 1998

[54] LED DISPLAY DEVICE AND METHOD FOR CONTROLLING THE SAME

[75] Inventor: Nozomu Takahashi, Kanagawa-ken, Japan

[73] Assignee: Kabushiki Kaisha Toshiba, Kawasaki, Japan

[21] Appl. No.: 622,212

[22] Filed: Mar. 27, 1996

[30] Foreign Application Priority Data

Mar. 30, 1995 [JP] Japan .................................. 7-073790
Mar. 21, 1996 [JP] Japan .................................. 8-064898

[51] Int. Cl.$^6$ ............................................ G09G 3/32
[52] U.S. Cl. ........................................... 345/82; 345/55
[58] Field of Search ........................... 345/82, 83, 147, 345/55, 48, 44, 46, 84

[56] References Cited

U.S. PATENT DOCUMENTS 3,906,482  9/1975  Morrison ............................. 345/82
5,184,114  2/1993  Brown ................................. 345/83

FOREIGN PATENT DOCUMENTS 62-121492  6/1987  Japan .
1-67695   5/1989  Japan .
4-98089   8/1992  Japan .
6-13659   1/1994  Japan .

Primary Examiner—Regina D. Liang
Attorney, Agent, or Firm—Oblon, Spivak, McClelland, Maier & Neustadt, P.C.

[57] ABSTRACT

An LED display device and a method for controlling the same have been proposed which comprises at least an LED matrix circuit in which LEDs are arranged in a matrix fashion, an analogue switch for respectively selecting analogue display data for respective rows in said LED matrix circuit, a sample hold circuit for sample-holding the display data selected by the analogue switch, a driver for driving and controlling the LEDs in corresponding rows of the LED matrix circuit based on the display data being sample-held, and a counter and a decoder for generating a switching signal of the analogue switch. According to this configuration, a gradation display of the LEDs is executed by virtue of the display data as analogue signals.

16 Claims, 7 Drawing Sheets

LED DISPLAY DEVICE AND METHOD FOR CONTROLLING THE SAME

BACKGROUND OF THE INVENTION

1. Field of the Invention

The present invention relates to an LED display device in which gradation control of LEDs is executed by analogue signals and a method for controlling the same.

2. Description of the Prior Art

FIG. 1 is a schematic view showing a configuration of the conventional LED display device. In the conventional LED display device shown in FIG. 1, a large size screen of an LED module panel 105 is constituted of a plurality of LED units being arranged in this LED display device, analogue RGB signals are output as display data from a video capture board 101 which being built in an external apparatus, e.g., a computer 12, then the analogue RGB signals are A/D-converted into digital RGB signals by an A/D converter 102. The digital RGB signals are then processed by an interface 103 into display data signals which control LEDs actually. The display data signals are then supplied via a buffer 104 to an LED matrix circuit which constitutes each LED unit in the LED module panel 105. The LEDs arranged in the LED matrix circuit are then controlled based on the display data to provide desired gradation display.

Shown in FIG. 2 are detailed configurations of the LED matrix circuit and the interface 103 which constitute the LED module panel 105 shown in FIG. 1. In FIG. 2, the LED matrix circuit consists of a typical 32×32 LED array 106. According to red display data (RA to RH) formed of an 8-bit digital signal and green display data (GA to GH) formed of an 8-bit digital signal both being output from the A/D converter 102 shown in FIG. 1, a 256 gradation display may be obtained on this LED array 106 in two colors. The 8-bit red and green display data are once stored in a RAM 107. The stored display data are converted into display data signals having pulse widths corresponding to gradients by a gradation control circuit 108. The display data signals are supplied to concerned LEDs in the LED array 106 via a driver 110. As a result, the gradation of each LED is controlled in respective colors.

In the foregoing configuration, since the 256 gradation display may be achieved in respective colors according to 8-bit red and green display data, 16 sets of 32 input data lines 109 have been needed in FIG. 2 to input display data formed of digital signals into the interface 103. In addition, since input display data are to be hold once, the memory 107 has been needed. The number of the input data lines 109 and the capacity of the memory 107 are enhanced in proportional to increase in the number of gradation and increase in the display color.

As mentioned earlier, in the conventional LED display device, the display data in the form of analogue data being supplied externally are A/D-converted into the display data in the form of digital data, then the digital data are converted into the signals which control actually gradation display of the LEDs. Therefore, the A/D converter 102 and the memory 107 which stores and holds the digital signals obtained by A/D conversion must be employed. As the number of gradation is increased, the capacity of the memory 107 has to be enhanced. This renders a configuration of the display device complicate and also renders it difficult to implement a miniaturized lightweight display control portion.

Furthermore, since the display data is formed of the digital signals, a large number of input data lines are required. Such increase in the input data lines becomes remarkable in proportion to increase in the number of gradation, i.e., increase in the bit number of the digital signals, which causes the configuration to be complicate and causes the miniaturized lightweight display control portion to be difficult.

SUMMARY OF THE INVENTION

Therefore, the present invention has been made in light of the above drawbacks in the prior art, and it is an object of the present invention to provide an LED display device in which gradation display of LEDs is executed by virtue of display data formed of analogue signals and which includes a miniaturized lightweight display control portion and to a display control method for the same.

In order to achieve the above object, as shown in FIG. 3, in the LED display device the present invention, a data side driver circuit comprises an LED matrix circuit 1 in which light emitting diodes are arranged in an X-Y matrix fashion, a data driver 4 electrically coupled to a data side of the LED matrix circuit, a sample hold circuit 3 connected to the data driver 4, an analogue switch 2 connected to the sample hold circuit 3, a data decoder 6 connected to the analogue switch 2, and a data counter 5 electrically connected to the sample hold circuit 3, the analogue switch 2 and the data decoder 6 respectively. In addition, a scan side driver circuit comprises at least scan counters 7 and 8, a scan decoder 9, and a scan driver 10. According to the configuration shown in FIG. 3, display data formed of analogue signals supplied externally are received, then the display data for respective rows in the LED display circuit are respectively selected, and then the display data selected by the analogue signals are sampleheld by the sample hold circuit 3 based on the sample hold signal. Then, when the data driver 4 receives the display data which being sample-held by the sample hold circuit 3, it drives and controls corresponding LEDs in respective rows by the data driver 4. The data counter 5 and the data decoder 6 constitutes a signal generating circuit for generating the switching signal for the analogue switch 2 and the sample hold signal for the sample hold circuit 3.

Other and further objects and features of the present invention will become obvious upon an understanding of the illustrative embodiments about to be described in connection with the accompanying drawings or will be indicated in the appended claims, and various advantages not referred to herein will occur to one skilled in the art upon embodying of the invention in practice.

DETAILED DESCRIPTION OF THE EMBODIMENTS

Figure 1:
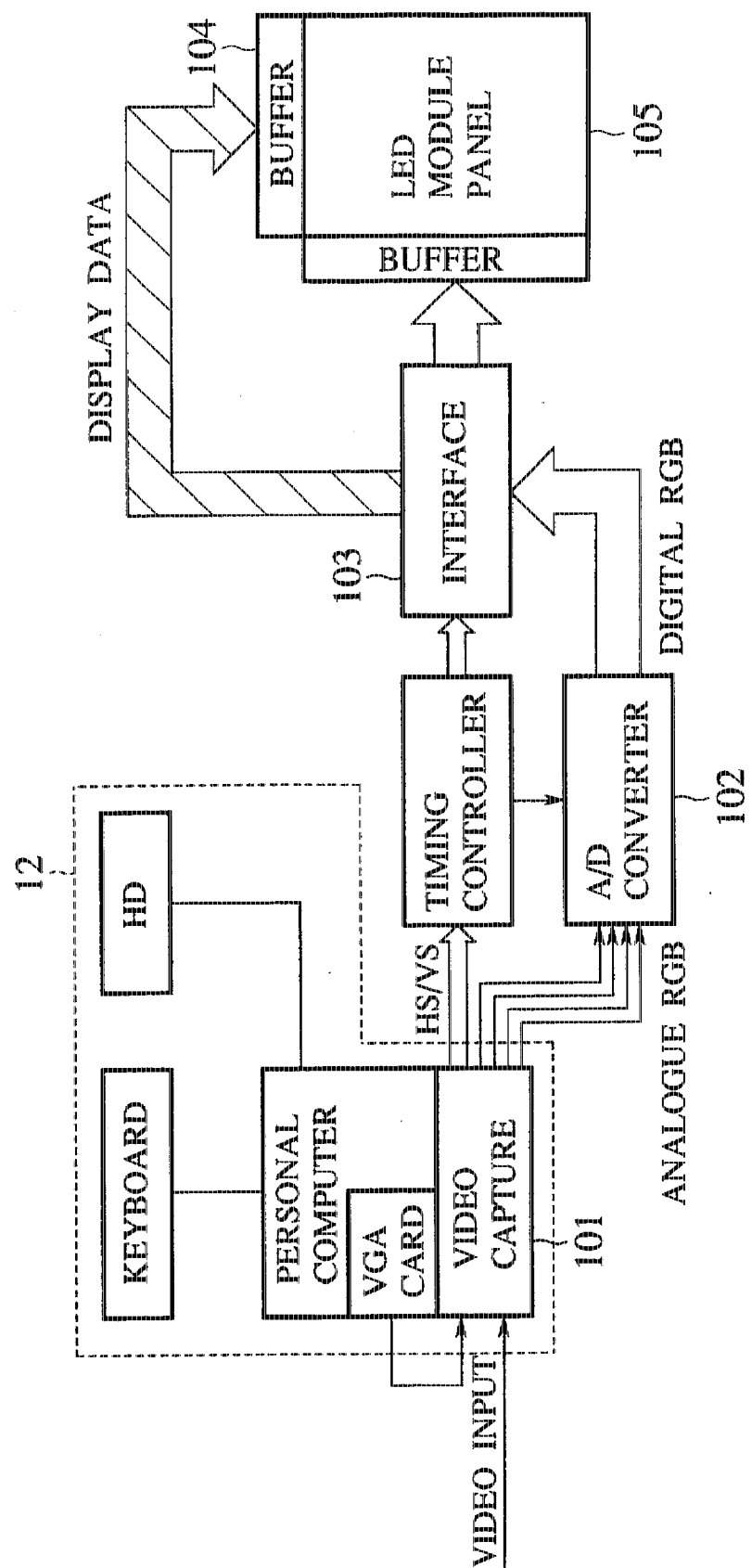
FIG. 1 is a schematic circuit diagram showing a system configuration of a display device composed of an LED module panel in which a plurality of conventional LED units are arranged in parallel.
Figure 2:
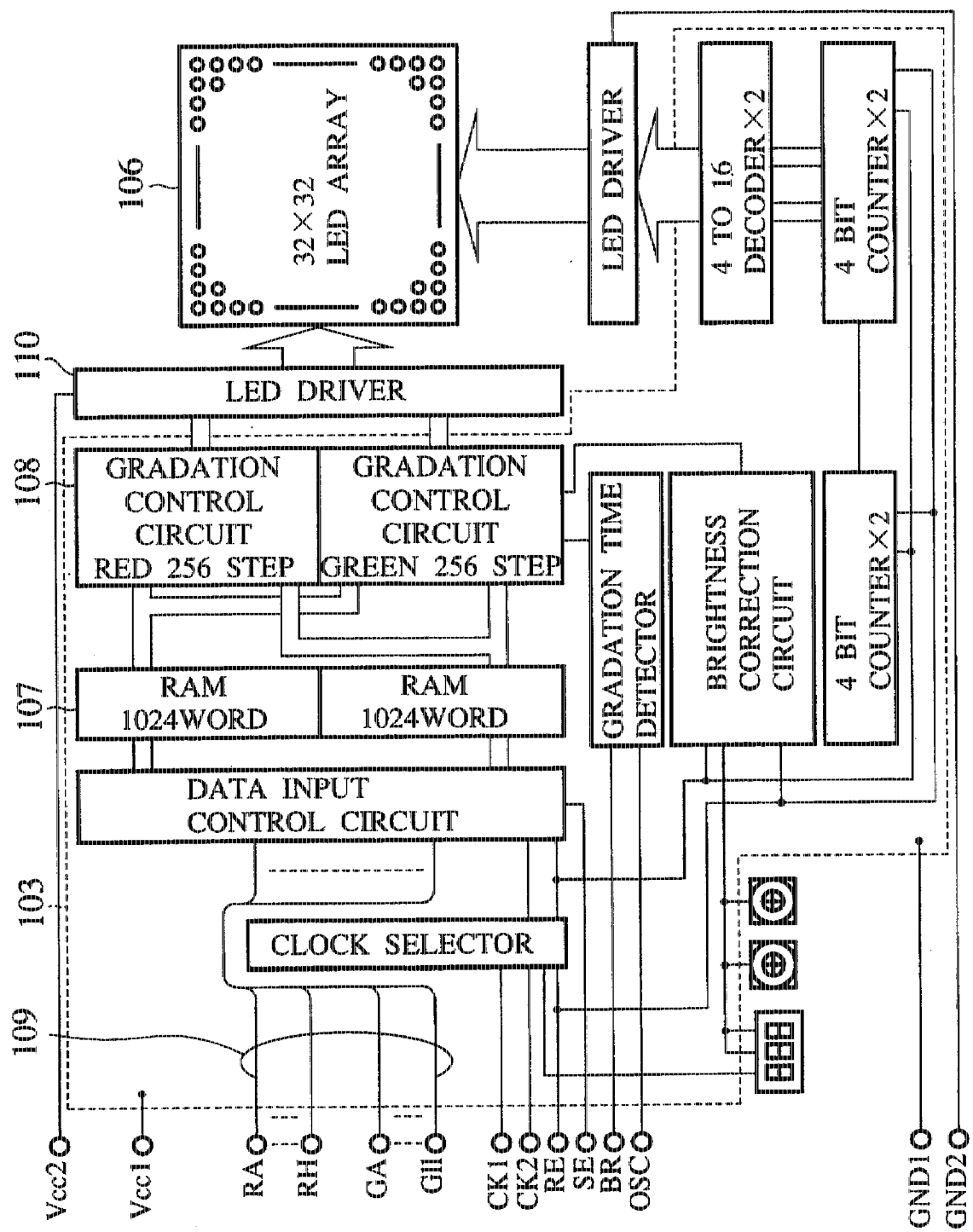
FIG. 2 is a circuit diagram showing detailed configurations of an LED matrix circuit and an interface which are provided in respective LED units constituting the conventional LED module panel shown in FIG. 1.

Various embodiments of the present invention will be described with reference to the accompanying drawings. It is to be noted that the same or similar reference numerals are applied to the same or similar parts and elements throughout the drawings, and the description of the same or similar parts or elements will be omitted or simplified.

Figure 3:
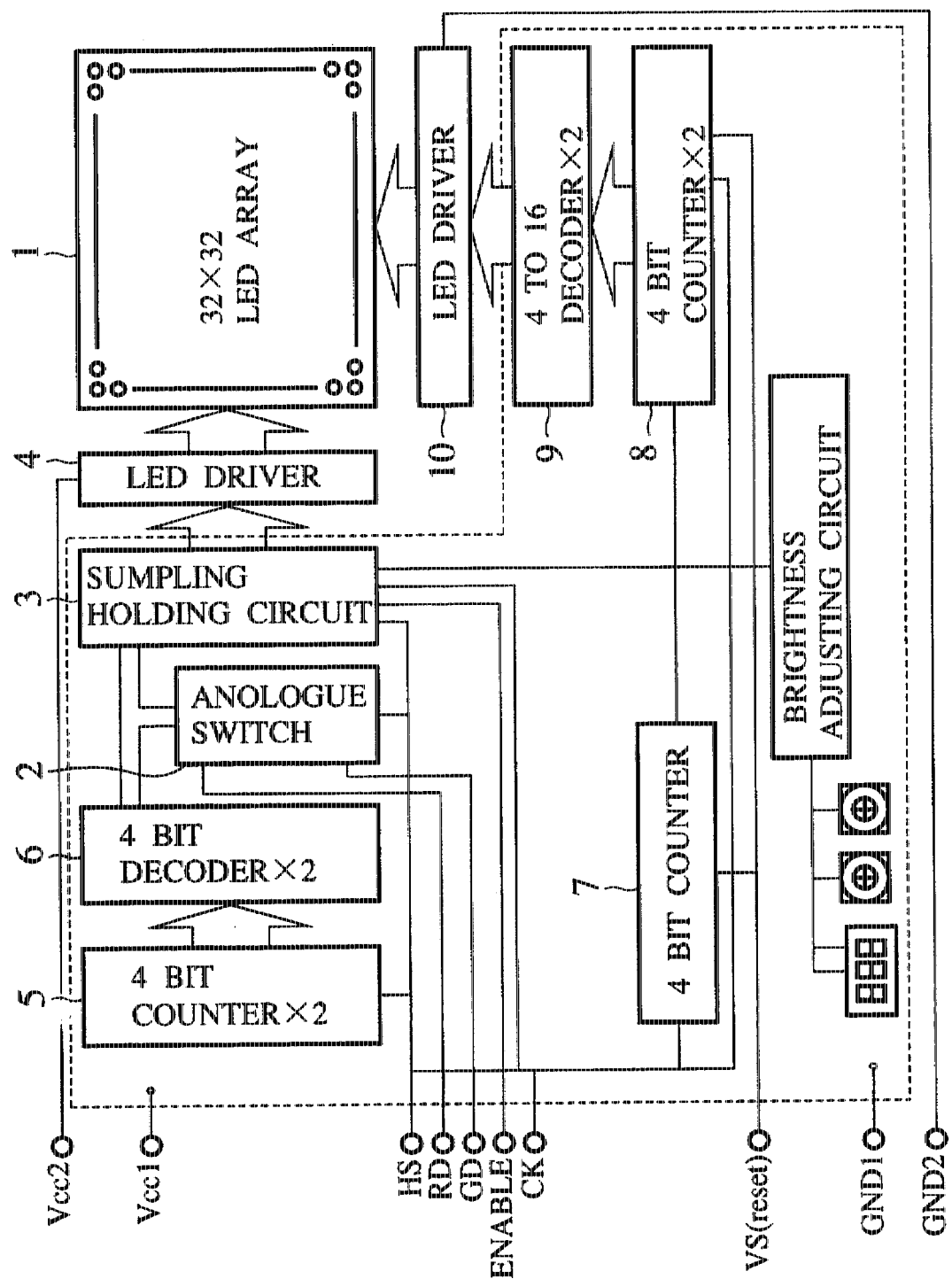
FIG. 3 is a schematic circuit diagram showing a configuration of an LED matrix circuit in the LED unit according to an embodiment of the present invention.
Figure 4:
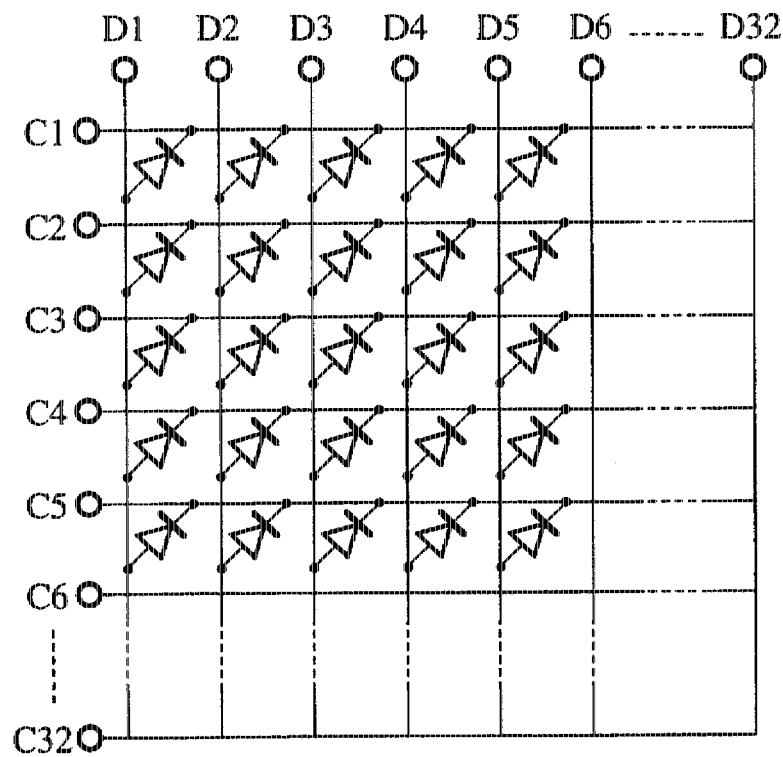
FIG. 4 is a circuit diagram showing an example of a configuration of the LED matrix circuit in the LED unit shown in FIG. 3.
Figure 5:
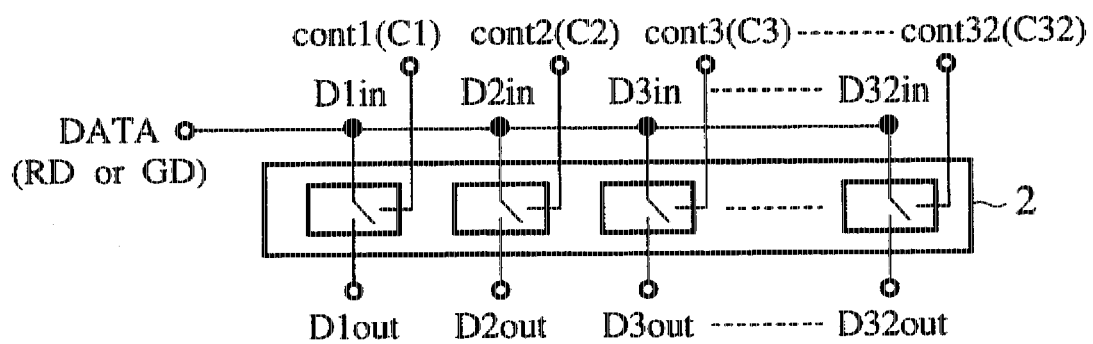
FIG. 5 is a circuit diagram showing an example of a configuration of an analogue switch of the LED unit shown in FIG. 1.

FIG. 3 is a view showing a configuration of an LED display device (LED unit) and a method for controlling a display thereon according to an embodiment of the present invention. The LED unit shown in FIG. 3 comprises an LED matrix circuit 1 which consists of 32×32 LEDs (light emitting diodes) arranged in a matrix fashion, as shown in FIG. 4, for instance, and is driven and controlled based on display data to effect a gradation display. On the data side (D1 to D32) of the LED matrix circuit 1, an analogue switch 2 being constructed as shown in FIG. 5, for example, is provided which receives analogue display data as an analogue signal supplied from externally and respectively selects analogue display data for respective rows D1 to D32 of the LED matrix circuit 1 based on a switching signal. In addition, provided on the data side of the LED matrix circuit 1 are a sample hold circuit 3 for sample-holding the analogue display data selected by the analogue switch 2 on the basis of a sample hold signal, a data driver 4 for receiving analogue display data which being sample-held by the sample hold circuit 3 and supplying drive and control signals for corresponding LEDs in respective rows to the LED matrix circuit 1 based on the analogue display data, a data counter 5 for counting a clock signal supplied externally, and a data decoder 6 for generating a switching signal of the analogue switch 2 and a sample hold signal of the sample hold circuit 3 by decoding count values derived from the data counter 5, then supplying the generated switching signal to the analogue switch 2, and then supplying the generated sample hold signal to the sample hold circuit 3. On the scan side (C1 to C32) of the LED matrix circuit 1 in FIG. 3, a scan side driver circuit is provided which comprises scan counters 7 and 8, a scan decoder 9, and a scan driver 10, which supplies drive and control signals of the LEDs in respective columns C1 to C32 in the LED matrix circuit 1 to the LED matrix circuit 1 based on decoded results which are obtained by counting a clock signal and decoding the counted values. The analogue switch 2, the sample hold circuit 3, and the data counter 5 on the data side are reset by a horizontal synchronizing signal.

Figure 6:
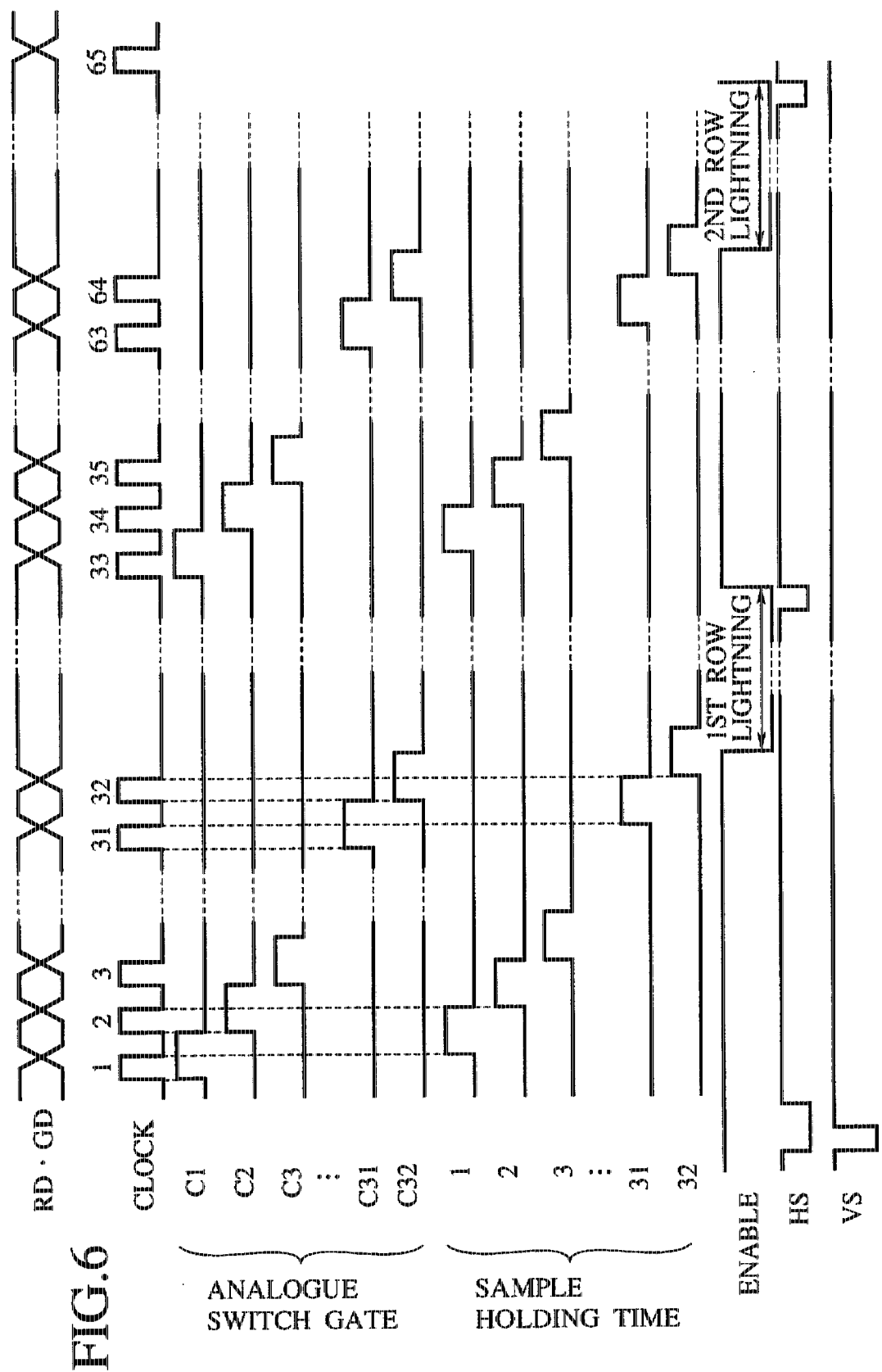
FIG. 6 is a timing chart illustrating an operation of the LED unit according to the embodiment of the present invention.

According to a timing chart shown in FIG. 6, the LED display device of the present invention controls a display of LEDs. As shown in FIG. 6, a clock signal used in the present embodiment is a signal which being intermitted every 32 clock, and thus 1024 clock signals are repeated although on and after the 66-th clock signal are omitted in FIG. 6.

In the LED display device of the present invention, a display operation may be executed by assigning a time interval between the first succeeding 32 pulse train and the next succeeding 32 pulse train, as an active time by an enable signal.

In this configuration, when analogue display data for driving and controlling the LEDs on the data side in the LED matrix circuit 1, i.e., D1, D2, ..., D32 in respective rows of the LED matrix circuit 1, are given to the analogue switch 2, analogue display data for respective rows are selected by the analogue switch 2, a switching operation of which being controlled synchronously with a leading edge of the clock pulse, based on the switching signal supplied from the data decoder 6 shown in FIG. 6. The analogue display data for respective rows selected by the analogue switch 2 are supplied respectively to the corresponding sample hold circuit 3 synchronously with a trailing edge of the clock pulse, and sample-held respectively by the corresponding sample hold circuit 3 based on the sample hold signal supplied from the data decoder 6. Respective analogue display data which being sample-held by the sample hold circuit 3 are supplied respectively to the corresponding data driver 4, and supplied from the data driver 4 to the corresponding LEDs in respective rows D1, D2, ..., D32 as the drive signal for driving and controlling LEDs in respective rows of the LED matrix circuit 1.

Conversely the driving signal on the scan side can be sequentially supplied to respective LED columns C1, C2, ..., C32 in the LED matrix circuit 1 by the scan side driver circuit which consists of the scan counters 7 and 8, the scan decoder 9, and the scan driver 10. Hence respective LEDs in the LED matrix circuit 1 are driven and controlled based on the analogue display data, so that a desired gradation display may be effected on the LED matrix circuit 1.

Figure 7:
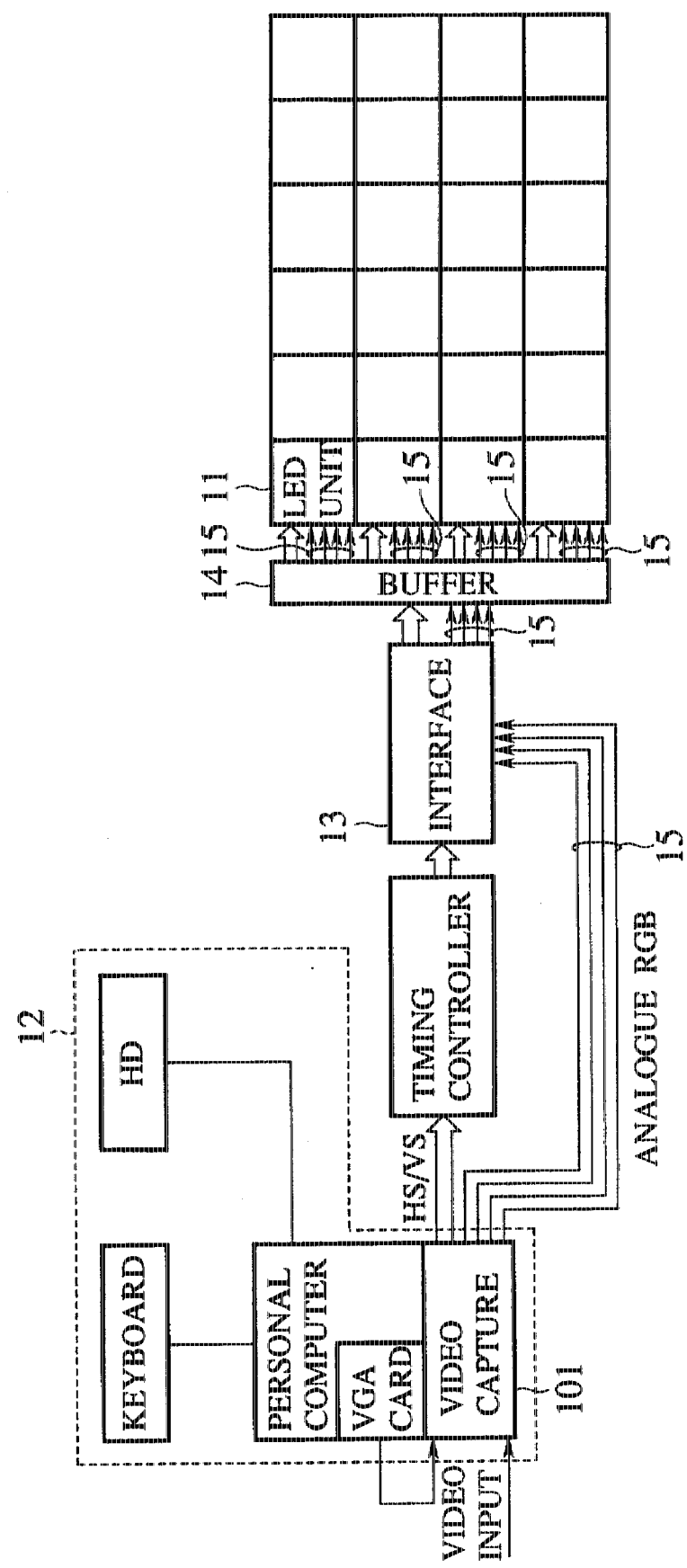
FIG. 7 is a schematic circuit diagram showing a system configuration of a large size display device (LED module panel) in which plural LED units are arranged in parallel, according to an application example of the LED unit shown in FIG. 3.

As stated above, in the event that, as shown in FIG. 7, the LED module panel constituting the large size display screen which is composed of a large number of the LED units 11 shown in FIG. 3 is driven by the external computer 12 via the interface 13, the number of data lines can be reduced significantly by employing the configuration wherein the display of LEDs may be controlled based on the display data formed of the analogue signal without employing the digital signal. More particularly, if the present invention is compared to the conventional configuration shown in FIG. 1 in the case of the drive control in two color display of red (R) and green (G), in the present invention it is feasible to transmit the display data as the analogue display data, which being identical to the conventional 16-bit display data, by virtue of 2 sets of 4 data lines which are the data lines from the computer 12 to the interface 13, from the interface 13 to the buffer 14, and from the buffer 14 to respective LED units 11. On the contrary, in the conventional configuration employing the display data formed of the digital signals shown in FIG. 1, 16 sets of 32 data lines are required for the same display control. Consequently, it would be understood that the data lines can be reduced extremely according to the embodiment of the present invention.

Moreover, in the above embodiment, since the analogue signal is employed, the memory of large capacity for holding temporarily the display data as in the conventional configuration shown in FIG. 1 can be omitted. This permits the configuration of the display controller in the LED module panel to be minitualized and lightened.

Figure 8:
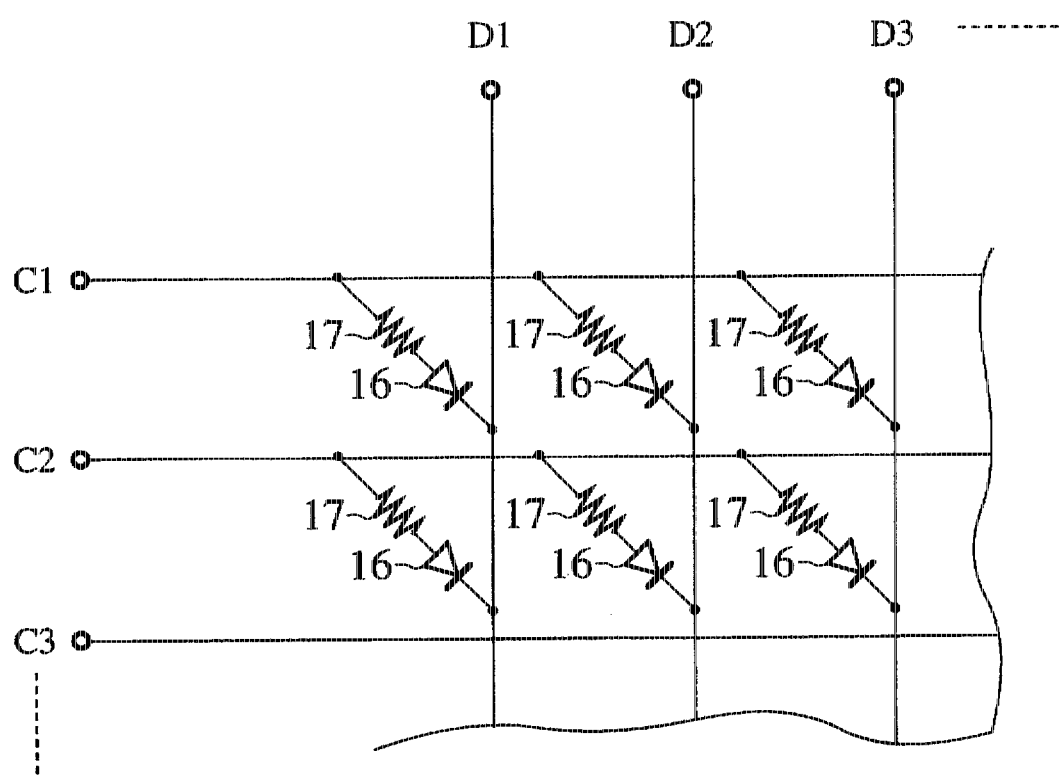
FIG. 8 is a fragmental circuit diagram showing another configuration of the LED matrix circuit shown in FIG. 4.

Note that as shown in FIG. 8 current limiting resistors 17 may be provided for respective LEDs 16 relative to the configuration of the LED matrix circuit 1 shown in FIG. 4. In such configuration, since difference in light emitting output by respective LEDs 16 be able to be compensated by adjusting current flowing through LEDs 16 by means of the resistors 17, quantity of the light emitted from respective LEDs 16 can be made uniform.

As has been mentioned above, according to the present invention, the number of the data lines which transmit the display data as the analogue signal to the LEDs can be lessened significantly. Furthermore, since the LEDs are driven to control their gradation by means of the display data of the analogue signal, the A/D converter and the large capacity memory can be eliminated which are needed when the LEDs are driven and controlled by means of the digital signal. As the result of the above, the configuration of the display controller can be minitualized significantly rather than the conventional one, so that the construction of a very-large-scale LED module panel and the like can be facilitated.

Various modifications will become possible for those skilled in the art after receiving the teachings of the present disclosure without departing from the scope thereof.

What is claimed is:

1. A light emitting diode display device comprising:
   a matrix circuit in which light emitting diodes are arranged in a matrix consisting of rows and columns;
   row driver having a plurality of output terminals, each output terminal electrically coupled to a respective row of said matrix circuit for driving a plurality of light emitting diodes on each respective row of said matrix circuit, each corresponding light emitting diode along each of the rows being connected in a direction orthogonal to the row direction to form corresponding columns of connected light emitting diodes;
   a sample hold circuit connected to said row driver for sample holding a received analogue display data based on a sample hold signal being supplied from a signal generating circuit; and
   an analogue switch connected to said sample hold circuit respectively selecting display data for a plurality of light emitting diodes on the respective rows in said matrix circuit based on a switching signal being supplied from an external source.

2. The device of claim 1, wherein the signal generating circuit is electrically coupled to said analogue switch to act as said external source as well as supplying said sample hold signal.

3. The device of claim 2, wherein said signal generating circuit comprises a data counter for counting a clock signal supplied externally, and a data decoder for decoding count values obtained by said data counter to generate said switching signal and said sample hold signal.

4. A device of claim 1, further comprising:
   (f) a scan driver electrically coupled to the light emitting diode arranged in respective columns in said matrix circuit;
   (g) a scan decoder connected to said scan driver; and
   (h) a scan counter connected to said scan decoder.

5. The device of claim 1, wherein said matrix circuit forms a part of a light emitting diode unit, and a large size module panel is formed by arranging a plurality of said light emitting diode units in parallel.

6. The device of claim 1, wherein resistors are serially connected to respective light emitting diode constituting said matrix circuit.

7. The device of claim 1, wherein said analogue switch has a number of input terminals corresponding to the number of said columns in said matrix and a number of output terminals.

8. The device of claim 7, wherein the number of analogue switch output terminals also corresponds to the number of said columns.

9. The device of claim 1, wherein said matrix has m rows and n columns, and said analogue switch has m input terminals and m output terminals, m an n being positive integer greater than 1.

10. The device of claim 9, wherein said sample hold circuit transfers m kinds of the display data so as to drive the plurality of light emitting diodes on said respective rows.

11. A light emitting diode display device comprising:
    a computer for generating analogue display data, horizontal synchronizing signals, and vertical synchronizing signals;
    a timing controller connected to said computer for receiving said horizontal synchronizing signals and said vertical synchronizing signals;
    an interface directly connected to said timing controller and said computer for outputting said analogue display data, said horizontal synchronizing signals, vertical synchronizing signals, a clock signal and an enable signal;
    a buffer connected to said interface; and
    a module panel connected to said buffer, said module panel including a plurality of light emitting diode units arranged in parallel with each unit further comprising:
    a matrix circuit of light emitting diodes having plural diodes connected together to form individual rows with corresponding diodes in each row connected in a direction orthogonal to the rows to form plural columns,
    a row driver having a different output connected to each row of diodes in the matrix circuit,
    a sample and hold circuit connected to supply inputs to said row driver relative to sampled and held analog display data received from analogue switch connected to the interface through the buffer; and
    wherein the analog switch and the sample and hold circuit are controlled by the clock signal, the horizontal synchronizing signals, and the enable signal provided from the interface.

12. The device of claim 11, wherein said computer and said interface, said interface and said buffer, and said buffer and said LED units are respectively connected together by pairs by analogue data lines.

13. The device of claim 12, wherein said computer and said interface are connected by only four analogue data lines.

14. A method of controlling a display device comprising the steps of:
    receiving analogue data from an external source;
    selecting analogue display data portions for display on a light emitting diode matrix circuit having the light emitting diodes arranged in a matrix of rows having corresponding light emitting diodes in each row connected in a direction orthogonal to a row connection direction to form plural columns;
    sample-holding the selected analogue display data for the respective rows;
    driving and controlling light emitting diodes on respective rows based on the analogue display data being sample-held; and
    applying a driving signal to at least a selected column of light emitting diodes having at least one light emitting diode in common with at least one of the respective rows to obtain a display.

15. The method of claim 14, wherein the step of selecting display data is controlled synchronously with a leading edge of a clock pulse.

16. The method of claim 14, wherein the step of sample-holding is controlled synchronously with a trailing edge of a clock pulse.

* * * * *